| United States Patent [19] | [11] Patent Number: 4,856,018 |
|---|---|
| Nozue et al. | [45] Date of Patent: Aug. 8, 1989 |

[54] LIGHT SOURCE FOR REDUCED PROJECTION

[75] Inventors: Yasuhiro Nozue, Yokohama; Koichi Kajiyama, Hiratuska; Kaoru Saito, Hiratsuka; Osamu Wakabayashi, Hiratsuka; Masahiko Kowaka, Hiratsuka; Yasuo Itakura, Hiratsuka, all of Japan

[73] Assignee: Kabushiki Kaisha Komatsu Seisakusho, Tokyo, Japan

[21] Appl. No.: 5,226

[22] Filed: Jan. 20, 1987

[30] Foreign Application Priority Data

Jan. 22, 1986 [JP] Japan ................................ 61-11765
Feb. 25, 1986 [JP] Japan ................................ 61-39455

[51] Int. Cl.$^4$ ................................................ H01S 3/03
[52] U.S. Cl. .......................................... 372/98; 372/57; 372/99; 372/103; 372/108
[58] Field of Search ................ 372/98, 99, 57, 103, 372/108

[56] References Cited

U.S. PATENT DOCUMENTS

| 3,919,665 | 11/1975 | Schmidt | 372/99 |
|---|---|---|---|
| 4,683,576 | 7/1987 | Nagashima et al. | 372/98 |
| 4,689,794 | 8/1987 | Brosnan | 372/57 |

FOREIGN PATENT DOCUMENTS 1443127  7/1976  United Kingdom ................ 372/98

OTHER PUBLICATIONS

Fua et al.; "Laser output . . . Etalons"; Optics and Laser Technology; Apr. 1975; vol. 7, No. 2; pp. 63–64.
LEEB; "Losses Introduced . . . Etalons"; Applied Physics; 6, No. 2; pp. 267–272; Mar., 1975.
"0.4 . . . "; News Review; Nikrei Microdevices; 5/1986; pp. 50–51.
Goldhar et al.; "An Injection . . . Quality"; IEEE Journal of Quantum Electronics, vol. AE16, No. 2, 02/1980.
Harris et al.; "Wide Band . . . EO$_2$ Laser"; Optics Communications; vol. 16, No. 1; 01/1976; pp. 57–62.

*Primary Examiner*—William L. Sikes
*Assistant Examiner*—Xuam Thi Vo

[57] ABSTRACT

A reduced projection light source comprises a laser device for emitting laser light having a transverse mode of multimodes, and an etalon located between a chamber of the laser device and a total reflection mirror. The light source is used as an exposure light source for transfer printing an ultrafine pattern on a semiconductor wafer.

4 Claims, 6 Drawing Sheets

LIGHT SOURCE FOR REDUCED PROJECTION

BACKGROUND OF THE INVENTION

1. Field of the Invention

This invention relates to a light source for reduced projection suitable as an exposure light source for transfer printing an extremely fine pattern on a semiconductor wafer.

2. Description of the Prior Art

The light source of this type is required to have a narrow line width of spectrum in order to provide a high resolution and it has been proposed to use an injection lock type excimer laser device as the light source.

As shown in FIG. 11, this laser device comprises an oscillator 10 acting as a stable resonator and an amplifier 20 acting as an stable resonator.

In the oscillator an oscillation occurs between mirrors 11 and 12 and the wavelength of a light beam is selected by a dispersion prism 13. Since the light beam is throttled by apertures 14 and 15 so that laser light having a narrow spectrum line width and a coherent beam characteristic can be produced. This laser beam is projected upon the amplifier through mirrors 17 and 18 with the result that the amplifier 20 undergoes a forced synchronous oscillation in a cavity mode.

The injection lock type excimer laser device can produce laser light having a narrow spectrum line width. However, since the transverse mode of the laser light is of a single mode, where the laser device is used as the light source for reduced projection, speckle (interference fringe) are formed thus failing to provide a high resolution.

SUMMARY OF THE INVENTION

Accordingly, it is an object of this invention to provide a novel light source for reduced projection capable of producing laser light having a transverse mode of multimodes and a narrow spectrum line width thus enabling a high resolution.

According to this invention, there is provided an excimer laser device producing laser light whose transverse mode is multimodes, and an etalon interposed between a total reflection mirror and a chamber of the excimer laser device.

DESCRIPTION OF THE PREFERRED EMBODIMENTS

Figure 1:
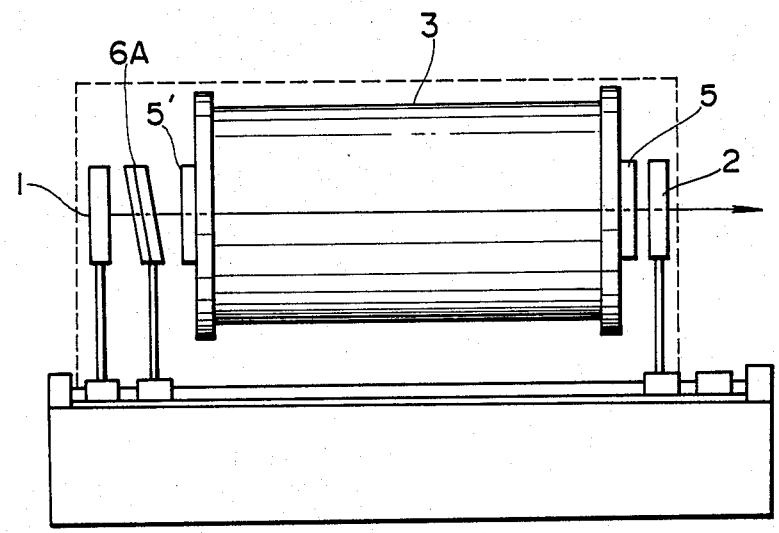
FIGS. 1-4 are diagrammatic side views respectively showing preferred embodiments of this invention.

A preferred embodiment of this invention shown in FIG. 1 is constituted by an excimer laser device comprising a total reflection mirror 1 acting as a rear mirror, an output mirror 2 acting as a front mirror and a chamber 3, and an air gap etalon 6A disposed between the total reflection mirror 1 and the chamber 3. The chamber 3 is filled with a gaseous mixture of argon Ar and fluorine F, a gaseous mixture of Krypton Kr and fluorine F. Further, discharge electrodes, not shown for exciting these gases are contained in the chamber 3. Windows 5 and 5' are provided for the opposite ends of the chamber 3.

In the excimer laser device, a laser oscillation is produced between mirrors 1 and 2 which constitute a stable resonator so that laser light is emitted from the output mirror.

The transverse mode of the laser light produced by the excimer laser device has an extremely high order. In other words, the transverse mode is multiple modes which are very important for preventing the interference fringes in the spectrum at the time of the reduced projection.

Figure 11:
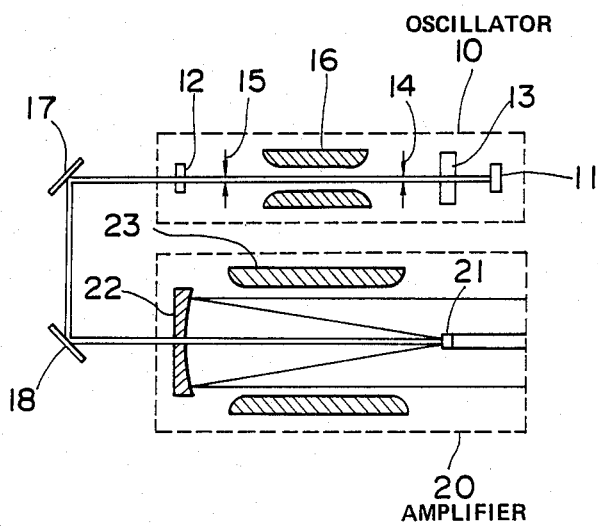

In each of the other gas laser devices and an injection lock type excimer laser device shown in FIG. 11, since their transverse mode is a single mode or a similar mode, such laser devices are not suitable for use in the reduced projection.

Let us describe the air gap etalon 6A acting as wavelength selecting means. Since the etalon 6A is disposed between the total reflection mirror 1 and the chamber 3 an extremely high wavelength selection effect can be obtained as will be described later. When the etalon is disposed at the position shown in FIG. 1. The light generated in chamber 3 impinges upon the total reflection mirror after it has passed through the etalon 6A. The light reflected by the mirror 1 passes again the etalon 6A and is then amplified. In other words, the light is subjected to the wavelength selection operation of the etalon during its go and return passes. For this reason, in this embodiment, laser light having an extremely narrow spectrum light can be produced.

Where the etalon 6A is disposed between the output mirror 2 and the chamber 3, a strong wavelength selecting function described above can not be expected so that it becomes impossible to reduce the spectrum line width.

Figure 2:
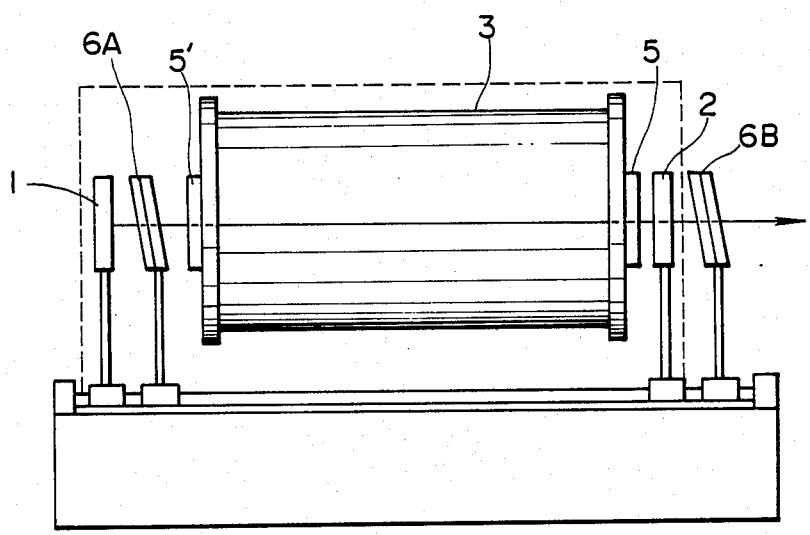

FIG. 2 shows a modified embodiment of this invention in which in addition to the etalon 6A described above, another etalon 6B is disposed on the outside of the cavity of the excimer laser device. With this modification, the laser light produced by the laser device shown in FIG. 1 would pass through the additional etalon 6B.

Figure 3:
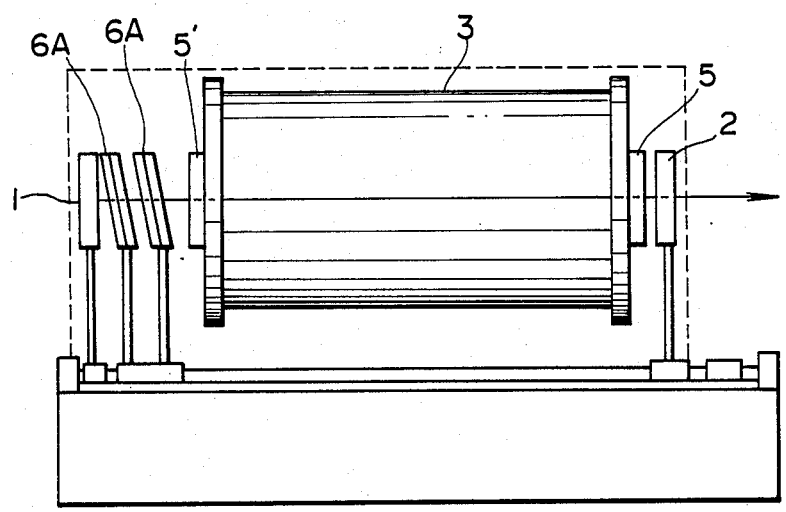

FIG. 3 shows another modification of this invention wherein m ($m \geq 2$) etalons 6A are arranged between the total reflection mirror 1 and the chamber 3.

Figure 4:
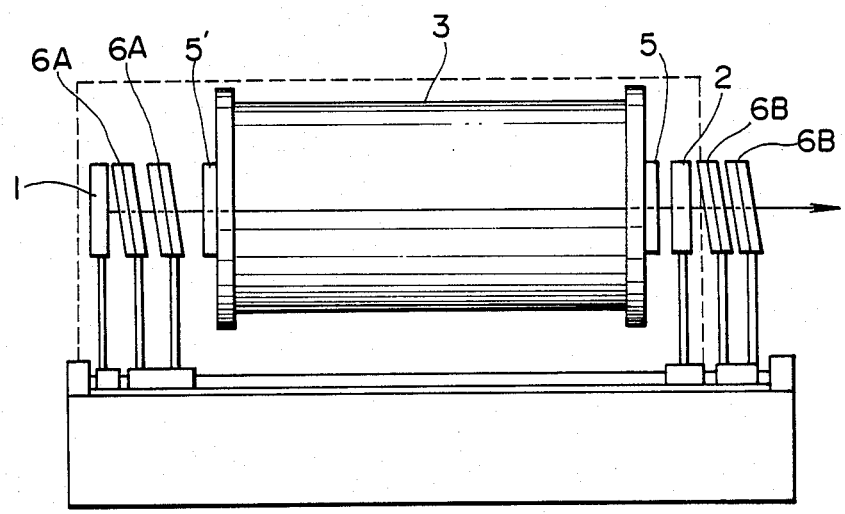

FIG. 4 shows another modification in which m etalons 6A and m etalons 6B shown in FIG. 2 are disposed.

The spectrum line width at the time of natural oscillation (oscillation without the etalon) of the excimer laser device ranges:

| | |
|---|---|
| 100 cm$^{-1}$ to 120 cm$^{-1}$ | at full width |
| 50 cm$^{-1}$ to 70 cm$^{-1}$ | at half width | so that the optimum free spectral range FSR of the etalon would be $$50 \text{ cm}^{-1} \leq FSR \leq 120 \text{ cm}^{-1}$$

Where an air gap etalon is used as the etalon, there is the following relation between the air gap spacing d and the free spectrum range FSR of the etalon $$FSR = \frac{1}{2nd} \quad (1)$$

where n represents the refractive index of the air gap. By selecting n=b 1, $$FSR = \frac{1}{2 \cdot 1 \cdot d}$$

Consequently, the range of air gap d necessary for obtaining the optimum free spectral range can be expressed by the following equation (2)

$$42 \text{ }\mu\text{m} \leq d \leq 100 \text{ }\mu\text{m} \quad (2)$$

Since there is a relation $$\Delta \sigma_{\frac{1}{2}} \approx \frac{FSR}{F}$$

between the finesse F and the line width (half width) $\Delta \sigma_{\frac{1}{2}}$ of the spectrum, the range of finesse F of the etalon necessary to reduce the spectrum line width $\Delta \sigma_{\frac{1}{2}}$ of the laser light spectrum to be less than 2 cm$^{-1}$ (an optimum line width for reduced projection), we can obtain $25 \leq F \leq 60$ by substituting $\Delta \sigma_{\frac{1}{2}} = 2$ cm$^{-1}$ and 50 cm$^{-1} \leq FSR \leq 120$ cm$^{-1}$ into equation (3)

The finesse F of the air gap etalon can be shown by the following equation (4) in which $F_F$ represents the surface finesse in the air gaps of the etalon and $F_R$ represents the finesse caused by reflection.

$$F = \text{total finesse } F_t 32 (F_F^{-2} + F_R^{-2})^{-\frac{1}{2}} \quad (4)$$

Consequently, it is sufficient to set the finesse caused by the surface finesse and the finesse $F_R$ caused by reflection such that the following relation is satisfied $$25 \leq (F_F^{-2} + F_R^{-2})^{-\frac{1}{2}} \leq 60$$

Thus, in the embodiment shown in FIG. 1, the specification of the etalon 6A necessary to obtain a line width 2 cm$^{-1}$ is as follows.

1. free spectral range: 50 cm$^{-1}$ ≤ FSR ≤ 120 cm$^{-1}$ (the air gap space d is set to be 42 $\mu$m ≤ d ≤ 100 $\mu$m.)
2. effective diameter: larger than 2 mm
3. total finesse: $25 \leq F_t \leq 60$ ($F_F$ and $F_R$ are set to satisfy a relation $25 \leq (F_F^{-2} + F_R^{-2})^{-\frac{1}{2}} \leq 60$)

In the embodiment shown in FIG. 2, let us call the etalon 6A disposed in the cavity of the excimer laser device as an internal etalon and call the etalon 6B disposed on the outside of the cavity as an external etalon, the specification of the internal and external etalon 6A and 6B necessary to obtain a spectrum line width of 2 cm$^{-1}$ is as follows.

Internal etalon 6A 1. free spectral range: 50 cm$^{-1}$ ≤ FSR ≤ 120 cm$^{-1}$ (when the air gap spacing d is set to 42 $\mu$m ≤ d ≤ 100 $\mu$m.)
2. effective diameter: larger than 2 mm
3. total finesse: $5 \leq F_t \leq 60$ ($F_F$ and $F_R$ are set to satisfy a relation $5 \leq (F_F^{-2} + F_R^{-2})^{-\frac{1}{2}} \leq 60$)

External etalon 6B 1. free spectral range: 2 cm$^{-1}$ ≤ FSR ≤ 20 cm$^{-1}$ (when the air gap spacing d is set to be 208 $\mu$m–2500 $\mu$m.)
2. effective diameter: larger than 2 mm
3. the overall finesse $F_{al} = F_{in} \cdot F_{out}$, that is the product of the total finesse $F_t = F_{in}$ of the internal etalon 6A and the total finesse $F_t = F_{out}$ of the external etalon 6B is set to satify the following relation $$25 \leq F_{in} \cdot F_{out} \leq 60$$

($F_F$ and $F_R$ are set to satisfy a relation $25 \leq (F_F^{-2} + F_R^{-2})^{-\frac{1}{2}} \cdot F_{in} \leq 60$)

In the embodiment shown in FIG. 3, the specification for m etalons is as follows.

Figure 6:
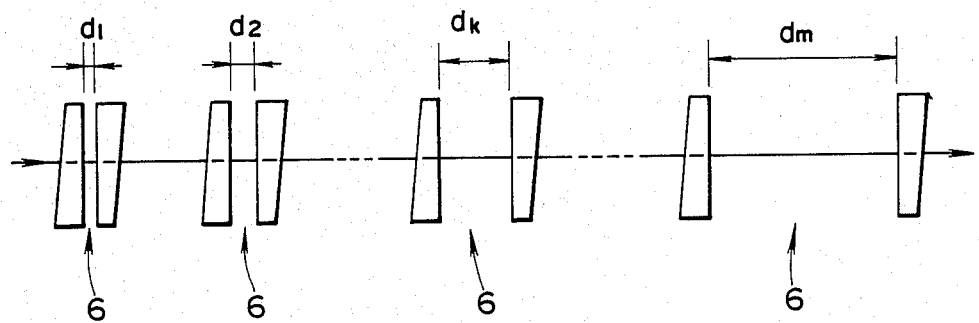
FIG. 6 shows the construction of an air gap etalon arranged in multiple stages.

As shown in FIG. 6, where m air gap etalons 6 are arranged in multi-stages, according to equation (1), the free spectral range FSR1 of the first etalon is expressed by $$FSR_1 = \frac{1}{2} nd_1 \quad (5)$$

whereas the spectral range of the k-th etalon (K=2,3, . . ., m) is shown by $$FSR_k = 1/(F_1 \cdot F_2 \cdots F_{k-1}) \cdot \frac{1}{2} nd_1 \quad (6)$$

where $F_1$ and $F_k$ represent the finesses of the first and k-th etalons. To obtain the spectral line width of 2 cm$^{-1}$, the free spectral range FSR$_1$ shown in equation (5) may be in a range of 50 cm$^{-1}$–120 cm$^{-1}$ when n=1. Furthermore, equation (6) shows that the k-th free spectrum range may satisfy a relation $$50 \text{ cm}^{-1} \leq FSR_k \cdot (F_1 \cdot F_2 \cdots F_m) \leq 120 \text{ cm}^{-1} \quad (7)$$

The overall finesse of respective etalons is expressed by $$F_{al} = F_1 \cdot F_2 \cdots F_m \quad (8)$$

In other words, in order to obtain a spectral line width of 2 cm$^{-1}$, the overallfinesse Fal may be in a range of 25–60.

Accordingly, the specification for the m etalons 6A of the embodiment shown in FIG. 3 is as follows.

1. The free spectral range of the first etalon is set to satisfy a relation $50 \leq FSR_1 \leq 120$, while that of the k-th etalon is set to satify equation (8) (in other words, the air gap spacing of the first etalon is set to satisfy a relation 42 $\mu$m ≤ d1 ≤ 100 $\mu$m and that of the k-th etalon is set to satisfy a relation 42 $\mu$m ≤ $d_k/F_1 F_2 \ldots F_{k-1}$ ≤ 100 $\mu$m
2. The effective diameter of each etalon-larger than B 2 mm
3. The overall finesse-$F_{al}$ is set to satisfy a relation $$25 \leq F_1 \cdot F_2 \cdots F_m \leq 60$$

Although in this embodiment, the first to m-th etalons are arranged in the order of incident of oscillation light. This is only the purpose of the description, and it is clear that other orders of arrangement can be used. Thus so long as each etalon satisfies the above described specification, the order of arrangement may be random.

The following Table I shows examples 1-12 of the specification of respective air gap etalons 6A and 6B.

The specifications for the m internal etalons and m external etalons of the embodiment shown in FIG. 4 are the same as the specification of the m internal etalons 6A of the embodiment shown in FIG. 3. In this embodiment too, the order of arrangement of the internal etalons may be random so long as the specification described above is fulfilled.

TABLE I

| Example of Specification | Air Gap [μm] | Reflection Index [%] | Surface Fineness [632.8 nm] | Effective Diameter [mm] | Total Finesse Ft | Free Spectrum Range [cm⁻¹] |
|---|---|---|---|---|---|---|
| 1 | 100 | 60 | λ/50 | 30φ | 5.2 | 50 |
| 2 | 100 | 70 | λ/30 | 30φ | 4.9 | 50 |
| 3 | 100 | 80 | λ/30 | 30φ | 5.44 | 50 |
| 4 | 100 | 90 | λ/30 | 30φ | 5.77 | 50 |
| 5 | 100 | 90 | λ/50 | 30φ | 9.3 | 50 |
| 6 | 100 | 95 | λ/30 | 30φ | 5.86 | 50 |
| 7 | 42 | 90 | λ/50 | 30φ | 9.3 | 120 |
| 8 | 385 | 73 | λ/50 | 30φ | 7.0 | 13 |
| 9 | 500 | 80 | λ/30 | 30φ | 5.44 | 10 |
| 10 | 500 | 62 | λ/50 | 30φ | 5.5 | 10 |
| 11 | 625 | 60 | λ/30 | 30φ | 4.23 | 8.0 |
| 12 | 926 | 50 | λ/20 | 30φ | 3 | 5.4 |

In this Table the surface finesse is represented by using the oscillation wavelength λ=632.8 nm of a He-Ne laser device.

The following Table II shows the laser light spectrum line width and the output ratio in cases where the internal etalon 6A and the exteral etalon 6B shown in FIG. 2 and satisfying the examples of the specifications shown in Table I are suitably combined.

In Table II, the output ratio means the ratio of the oscillation output when etalons 6A and 6B are not used to that when the etalons are used.

TABLE II

| Example of Combination | Specification of Internal Etalon | Specification of External Etalon | Line Width [cm⁻¹] | Output Ratio [%] |
|---|---|---|---|---|
| 1 | 1 | 2 | 1.5 | 30 |
| 2 | 1 | 10 | 1.1 | 16 |
| 3 | 2 | 9 | 1.2 | 12 |
| 4 | 2 | 10 | 1.1 | 14 |
| 5 | 3 | 9 | 1.0 | 14 |
| 6 | 3 | 10 | 1.3 | 11 |
| 7 | 4 | — | 1.5 | 50 |
| 8 | 4 | 11 | 1.1 | 20 |
| 9 | 5 | 11 | 0.8 | 18 |
| 10 | 6 | 10 | Not oscillate | 0 |
| 11 | 7 | 8 | 1.8 | 10 |

In example 10 of Table II, since the reflective index of the internal etalon 6A is about 95%, the throughput becomes small thus disenabling oscillation, but in other examples, a line width of less than 2 cm⁻¹ can be obtained. The interference was investigated by passing the laser lights of respective combinations through a pinhole and found that no interference fringe was formed. Thus it was found that the transverse mode of the laser light is of the multimodes that is there are sufficiently large number of transverse modes.

The term "throughput" means the ratio of strength of the input light when light of a selected wavelength is passed through an etalon to the strength of the output light is defined by the following equation $$t = \left(1 - \frac{A}{1 - R}\right)^2$$

where
A: absorption index
R: reflective index

The following Table III shows the result of experiments where the number of internal etalons of the embodiment shown in FIG. 3 was made to be m=2, and the specifications of the one and other internal etalons were suitably selected and combined from Table I.

TABLE III

| Example of Combination | Specification of Internal Etalon | Specification of another internal Etalon | Line Width [cm⁻¹] | Output Ratio [%] |
|---|---|---|---|---|
| 1 | 1 | 9 | 0.8 | 38 |
| 2 | 1 | 10 | 0.9 | 47 |
| 3 | 2 | 9 | 0.9 | 30 |
| 4 | 2 | 10 | 0.9 | 28 |
| 5 | 3 | 9 | 0.8 | 23 |
| 6 | 3 | 10 | 0.9 | 24 |
| 7 | 4 | 9 | 1.0 | 14 |
| 8 | 4 | 11 | 1.0 | 18 |
| 9 | 5 | 11 | 0.7 | 14 |
| 10 | 7 | 8 | 1.0 | 13 |

As shown in Table III in each of the combinations 1-10 a line width of less than 2 cm⁻¹ was obtained. Comparison of these experimental data with those shown in Table II clearly shows that the construction shown in FIG. 3 has smaller power loss than that shown in FIG. 2. Furthermore, a sufficient number of lateral modes was obtained with the combinations shown in Table III.

Figure 5:
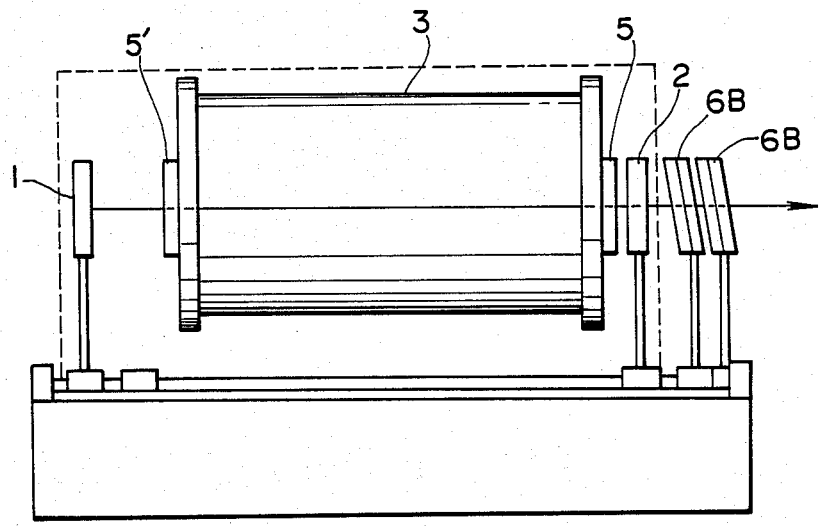
FIG. 5 is a diagrammatic representation showing an arrangement wherein an etalon is disposed on the outside of the cavity of an excimer laser device.

The following Table IV shows the result of experiment where only two external etalons were used as shown in FIG. 5.

TABLE IV

| Example of Combination | Specification of Internal Etalon | Specification of External Etalon | Line Width [cm⁻¹] | Output Ratio [%] |
|---|---|---|---|---|
| 1 | 1 | 9 | 1.8 | 3 |
| 2 | 1 | 10 | 1.9 | 2 |
| 3 | 2 | 9 | 1.9 | 2 |
| 4 | 2 | 10 | 2 | 3 |
| 5 | 3 | 9 | 1.8 | 2 |
| 6 | 3 | 10 | 1.8 | 2 |
| 7 | 4 | 9 | 1.9 | 2 |
| 8 | 4 | 11 | 1.9 | 2 |
| 9 | 5 | 11 | 1.8 | 2 |
| 10 | 6 | 10 | 1.9 | 1 |
| 11 | 7 | 8 | 1.8 | 3 |

As shown in Table IV, in each one of the combinations 1-11, a line width of less than 2 cm⁻¹ was obtained, but the output (1-3%) ratio was decreased from than the experimental data shown in Table II. This shows that when only the external etalon 6B is used for decreasing the spectral line width the power loss becomes large thus preventing practical use.

Although in each embodiment shown in FIGS. 1-4, an air gap etalon was used as the etalon 6A, a solid etalon can be substituted for the air gap etalon.

In the embodiments described above, the effective diameter of windows 5 and 5' was set to be larger than 2 mm and a slit (aperture) of less than 2 mm was not installed in the cavity of the excimer laser device.

Figure 7:
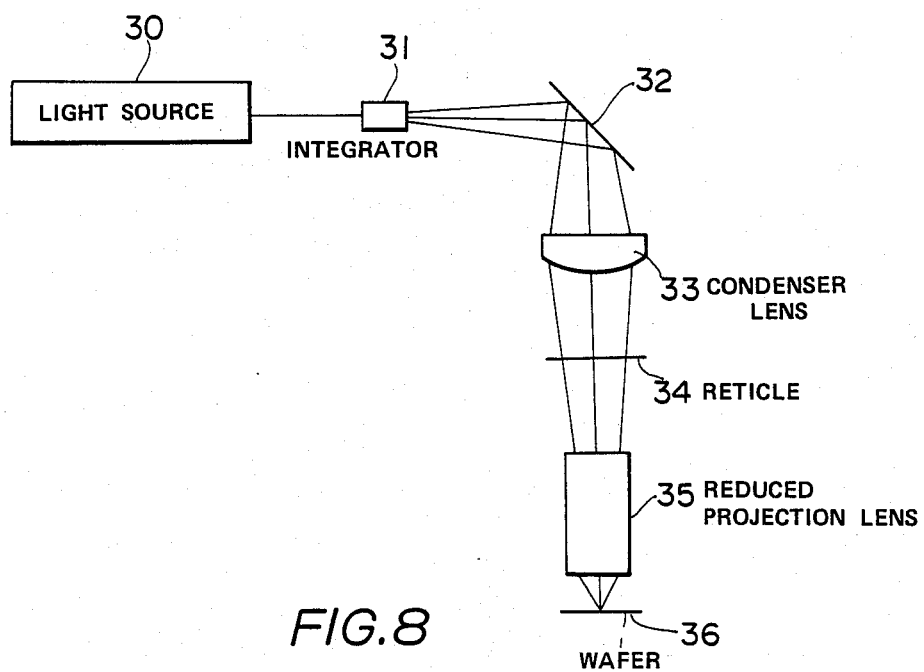
FIG. 7 is a diagrammatic representation of the construction of the reduced projection exposure device.

FIG. 7 diagrammatically shows a reduced projection exposure device wherein light projected from a reduced projection light source 30 is conveyed to a wafer 36 through an integrator 31, a reflecting mirror 32, a condenser lens 33, a reticle 34 and a reduced projection lens 35 so as to project a pattern on the rectile 34 upon the wafer 36.

In this apparatus, where a high pressure mercury lamp, for example, is used as the light source, it is impossible to expose a fine pattern because the maximum resolution is only about 0.5 m. Furthermore, as the spectral line width of the mercury lamp is relatively wide, a color aberration compensation is necessary. For this reason, it is necessary to use a reduced projection lens 35 of a complicated construction comprising a combination of glasses having different refractive indices. This not only makes difficult to design lens 35 but also increases its manufacturing cost.

Where the light source described above is used in the embodiments shown in FIGS. 1-4 laser light having spectrum line width of less than 2 cm$^{-1}$ can be obtained so that no color aberration compensation is necessary. Accordingly, it is possible to fabricate the projection lens with quartz above, whereby the lens can be designed readily and manufactured at a low cost.

With this embodiment, as it is possible to decrease the spectrum line width without decreasing the number of the transverse modes there is no fear of producing such problem as speckle at the time of projection. Accordingly, it is possible to construct projection apparatus of high resolution.

In an excimer laser device, since the reflective index of the output mirror has an influence upon the output efficiency thereof, the laser output would decrease unless the reflective index is optimum.

Let us consider how to optimize the reflective index of the output mirror in order to efficiently deriving out the laser output of the excimer laser device.

In the embodiment shown in FIG. 1, an air gap etalon having a free spectrum range of 42 cm$^{-1}$, a finesse of 1.7, and an effective diameter of 30 mm was used and an experiment was carried out for investigating the relation between the reflective index of the output mirror 2 and an excimer laser device utilizing Kr and F.

Figure 8:
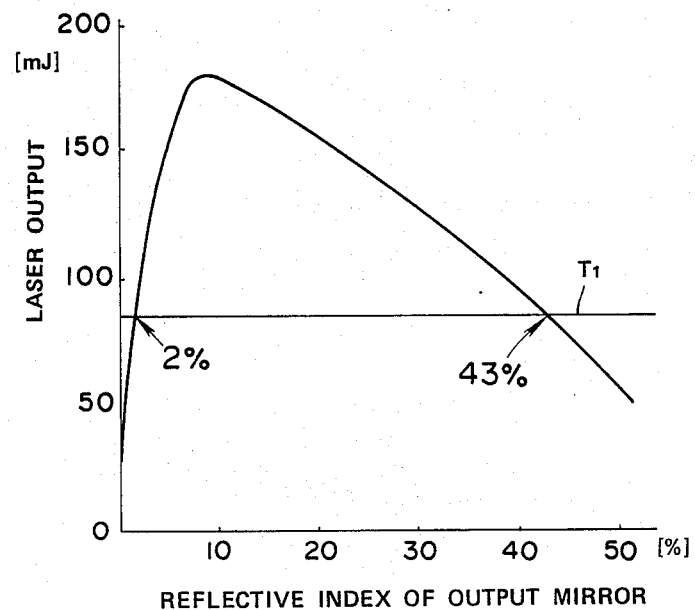
FIG. 8 is a graph showing the relation between the reflective index of an output mirror and a laser output.

FIG. 8 shows the result of this experiment showing that a maximum output (180 mJ) can be taken out when the output mirror 2 has a reflective index of about 8%. Taking one half value (90 mJ) of the maximum output as a threshold value T$_1$, for judging high or low of the efficiency of the excimer laser device, as can be noted from FIG. 8, a sufficiently practical output can be efficiently taken out when the reflective index of the output mirror lies in a range between 2% and 43%.

Figure 9:
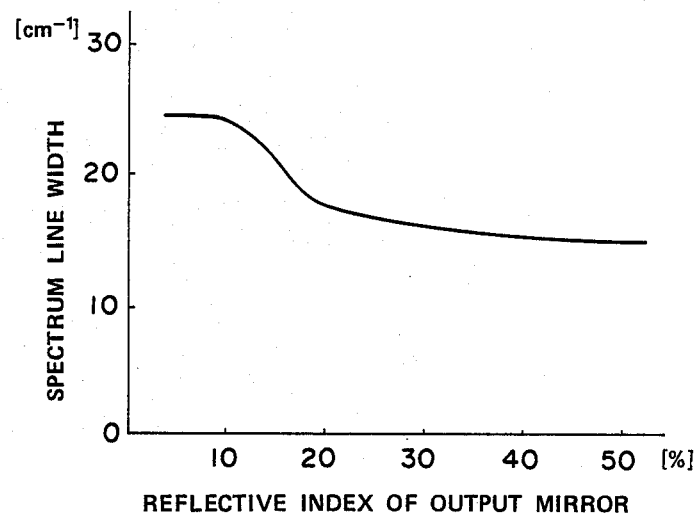
FIG. 9 is a graph showing the relation between the reflective index of the output mirror and the spectrum line width.

As the reflective index of the output mirror is increased, the number of turns of light in the cavity increases so that the spectral line width of the laser light becomes narrow. FIG. 9 is a graph showing the reflective index of the output mirror 2 and the spectrum line width.

Figure 10:
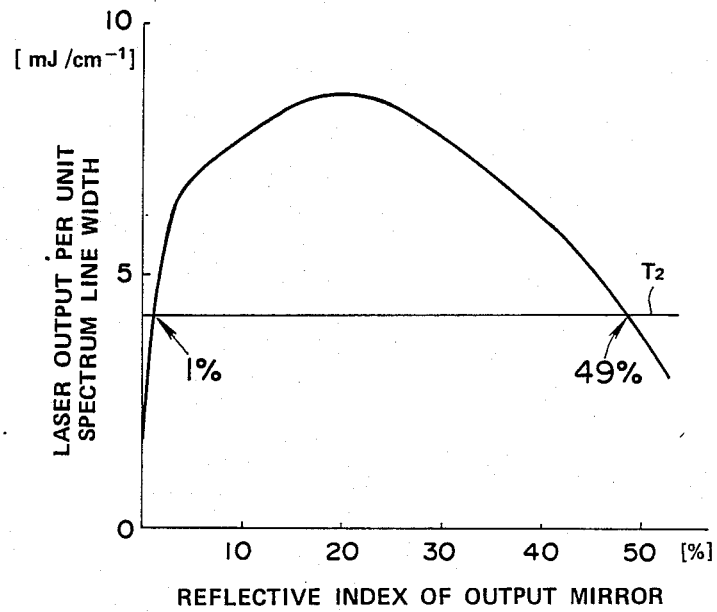
FIG. 10 is a graph showing the relation between the reflective index of the output mirror and the laser output per unit line width and FIG. 11 is a diagrammatic representation showing the construction of the injection lock type excimer laser device.

FIG. 10 shows a graph obtained by dividing the laser output showing FIG. 8 with the spectral line width shown in FIG. 9, the graph showing the relation between the reflective index of the output mirror 2 and the laser device output per unit spectral line width.

FIG. 10 shows that the laser output per unit line width becomes a maximum (8.6 mJ/cm$^{-1}$) when the reflective index of the output mirror is about 20%. Taking one half value (4.3 mJ/cm$^{-1}$) of the maximum laser output per unit line width as a threshold value T$_2$ for judging high or low of the efficiency of the laser output per unit line width, it is possible to efficiently take out the laser output per unit line width when the reflective index of the output mirror lies in a range of from 1% to 49%, as can be noted from the graph.

It should be understood that the relation shown in FIG. 10 also holds true for the embodiment shown in FIGS. 1-4.

Briefly state, in the above described embodiments employing internal etalon 6A, so long as the reflective index of the output mirror 2 is set in a range of from 1 to 49%, it is possible to obtain sufficient laser output per unit spectrum line width.

What is claimed is:

1. A narrow line width excimer laser adapted to be used as a light source for reduced projection, comprising:
    a front mirror for outputting an oscillation laser beam, said front mirror having a reflective index of from 1 to 49%;
    a rear mirror for reflecting said oscillation laser beam;
    a laser chamber provided between said front mirror and said rear mirror, said laser chamber containing KrF gas and means for exciting said KrF gas; and
    at least one etalon provided between said laser chamber and said rear mirror, said etalon having an effective diameter sufficiently large for multi-transverse mode oscillation.

2. The narrow line width excimer laser as set forth in claim 1 wherein said etalon comprises an air gap etalon.

3. The narrow line width excimer laser as set forth in claim 1 wherein a plurality of said etalons are used which are arranged in a plurality of stages.

4. The narrow line width excimer laser as set forth in claim 1 further comprising another etalon located on the outside of a cavity of said laser device.

* * * * *